United States Patent
Chaponniere et al.

(10) Patent No.: US 7,746,831 B2
(45) Date of Patent: *Jun. 29, 2010

(54) METHOD AND APPARATUS FOR CONTROLLING GAIN LEVEL OF A SUPPLEMENTAL CHANNEL IN A CDMA COMMUNICATION SYSTEM

(75) Inventors: Etienne Chaponniere, San Diego, CA (US); Vladislav Sorokine, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 823 days.

This patent is subject to a terminal disclaimer.

(21) Appl. No.: 11/212,323

(22) Filed: Aug. 25, 2005

(65) Prior Publication Data

US 2006/0002348 A1    Jan. 5, 2006

Related U.S. Application Data

(63) Continuation of application No. 09/895,375, filed on Jun. 29, 2001, now Pat. No. 6,937,584.

(51) Int. Cl.
*H04B 7/216* (2006.01)
(52) U.S. Cl. ........................... 370/335; 370/342
(58) Field of Classification Search ............... None
See application file for complete search history.

(56) References Cited

U.S. PATENT DOCUMENTS 5,987,326 A * 11/1999 Tiedemann et al. ......... 455/442
6,058,107 A * 5/2000 Love et al. ................... 370/332
6,137,840 A   10/2000 Tiedemann, Jr. et al.

(Continued)

FOREIGN PATENT DOCUMENTS

KR    2001-0009425    2/2001

(Continued)

OTHER PUBLICATIONS

TIA/EIA/IS-95, "Mobile Station-Base Station Compatibility Standard For Dual-Mode Wideband Spread Spectrum Cellular System", Jul. 1993.

(Continued)

*Primary Examiner*—Bob A Phunkulh
(74) *Attorney, Agent, or Firm*—Sayed H. Beladi; Rupit M. Patel

(57) ABSTRACT

In a code division multiple access communication system (100), a method and accompanying apparatus provide for controlling gain of a forward supplemental channel (482) by determining gain level of a forward fundamental channel (481) associated with supplemental channel (482) for being targeted for a common mobile station, determining an adaptive margin (Ma) for fundamental channel (481) and determining a forward supplemental channel gain (Gsch) based on the gain of supplemental channel (482) and the Ma. The Gsch may be successively decreased for subsequent data frames targeted for the common mobile station on supplemental channel (482) by successively decreasing the Ma until receiving a supplemental channel frame erasure indicator from the common mobile station. The Gsch may be increased for a subsequent data frame targeted for the common mobile station on supplemental channel (482) by increasing the Ma after receiving the supplemental channel frame erasure indicator from the common mobile station.

32 Claims, 10 Drawing Sheets

U.S. PATENT DOCUMENTS

| | | | |
|---|---|---|---|
| 6,148,208 | A | 11/2000 | Love |
| 6,459,723 | B1 | 10/2002 | Kim et al. |
| 6,535,500 | B1 * | 3/2003 | Su .............................. 370/342 |
| 6,590,873 | B1 | 7/2003 | Li et al. |
| 6,590,879 | B1 | 7/2003 | Huang et al. |
| 6,603,752 | B1 | 8/2003 | Saifuddin et al. |
| 6,631,126 | B1 | 10/2003 | Berliner et al. |
| 6,643,272 | B1 | 11/2003 | Moon et al. |
| 6,704,328 | B1 | 3/2004 | Khaleghi et al. |
| 6,724,719 | B1 * | 4/2004 | Tong et al. .................. 370/209 |
| 6,724,740 | B1 * | 4/2004 | Choi et al. .................. 370/335 |
| 6,757,270 | B1 | 6/2004 | Kumar et al. |
| 6,781,966 | B1 | 8/2004 | Kim |
| 6,781,969 | B2 | 8/2004 | Kikides et al. |

FOREIGN PATENT DOCUMENTS

| | | |
|---|---|---|
| WO | 0126246 | 4/2001 |

OTHER PUBLICATIONS

TIA/EIA/IS-856, "cdma2000 High Rate Packet Data Air Interface Specification", Nov. 2000.

"IMT-2000, J. Visser, et al., ITU-T Recommendation Q.1701 (Formerly Q.FIN) Version 4.2 -Framework for IMT-2000 Networks, Geneva, May 5-22, 1998".

TR-45.5, 3GPP2 C.S002-C, Version 1.0, "Physical Layer Standard for CDMA2000 Spread Spectrum Systems, Release C", May 28, 2002.

3G TS 25.211 v4.1.0(Jun. 2001) Universal Mobile Telecommunicatiosn System (UMTS); Physical channels and mapping of transport channels onto physical channels (FDD), Release 4.

3G TS 25.212 v4.1.0(Jun. 2001) Universal Mobile Telecommunications System (UMTS); Multiplexing and channel codeing (FDD), Release 4 .

3G TS 25.213 v4.1.0(Jun. 2001) Universl Mobile Telecommunications System (UMTS); Spreading and modulation (FDD), Release 4.

3G TS 25.214 v4.1.0(Jun. 2001) Universal Mobile Telecommunications System (UMTS); Physical layer procedures (FDD), Release 4.

International Search Report-PCT/US02/19403-International Search Authority-European Patent Office-Mar. 24, 2003.

International Preliminary Examination Report—PCT/US02/19403, IPEA/US-Apr. 7, 2007.

* cited by examiner

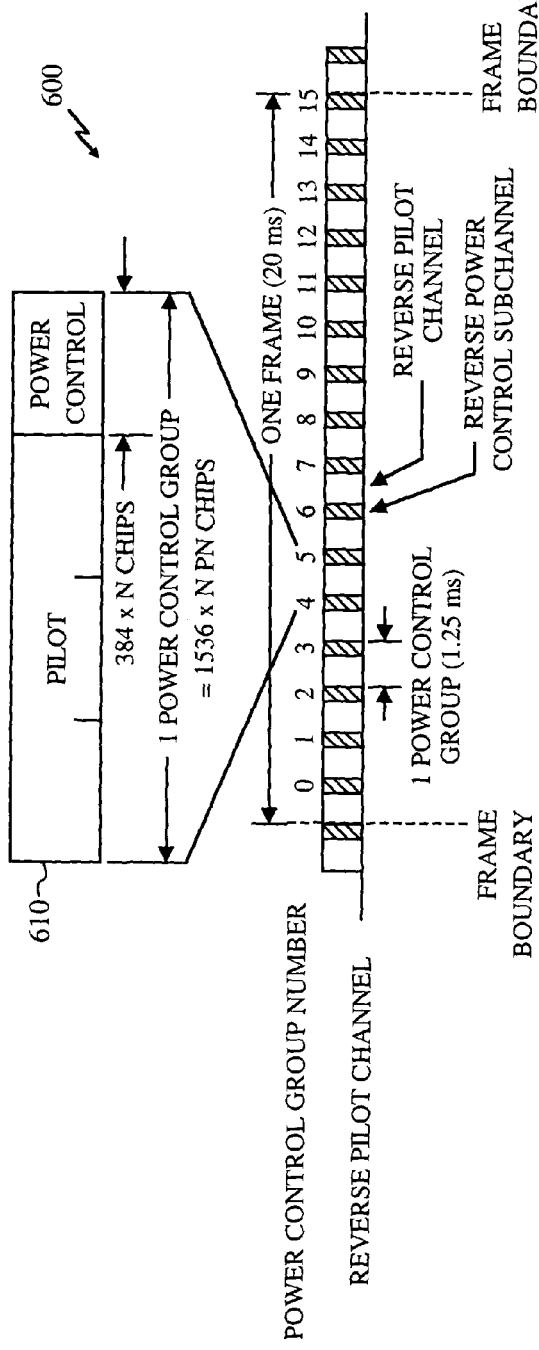

METHOD AND APPARATUS FOR CONTROLLING GAIN LEVEL OF A SUPPLEMENTAL CHANNEL IN A CDMA COMMUNICATION SYSTEM

CLAIM OF PRIORITY UNDER 35 U.S.C. §120

The present Application for Patent is a Continuation and claims priority to patent application Ser. No. 09/895,375 now U.S. Pat. No. 6,937,584 entitled "Method and Apparatus for Controlling Gain Level of a Supplemental Channel in a CDMA Communication System" filed Jun. 29, 2001, now allowed, and assigned to the assignee hereof and hereby expressly incorporated by reference herein.

BACKGROUND

1. Field

The present invention relates generally to the field of communications, and more specifically, to communications in a cellular communication system.

2. Background

In code division multiple access (CDMA) communication systems, a number of users in the same geographical area may choose to operate on a common carrier frequency. The signal from each user is encoded according to a unique assigned code. A receiver may receive signals from different users with a common carrier frequency. While a signal for one user is being decoded, the signals transmitted from all other users may be treated as interference. A receiver decodes each signal according to the assigned code. Moreover, excessive transmission by a user may cause interference for other users in addition to causing system overload at a base station. In a CDMA system, the power level of the signals transmitted by different users of the system is controlled to control the interference level. The power level of each signal is controlled at the transmitter to maintain an adequate quality of reception at a receiving end. Other reasons, such as conserving battery power, for controlling power level of signals in a CDMA system are well known by one of ordinary skill in the relevant art.

Although the power level of the transmitted signal from each user is controlled to maximize the use of the available channels, there is a need for an increased mobility and higher quality of communication services. Such communication services may include wireless radio transmission of digitized speech, still or moving images, text messages and other types of data. The communication channel between a mobile station and a base station may be over two or more related communication channels. One of the channels may be a fundamental channel, and another may be a supplemental channel. The fundamental channel may serve as the primary channel for all the traffic communications between the transmitter and the receiver. The supplemental channel may carry additional data. The supplemental channel may be bursty. The gain level of each channel may be based on the received quality level at the receiver. However, the bursty nature of the supplemental channel may create an inefficient power control scheme in the communication system. The power level may be based on the gain level of each communication channel through a power control scheme in the communication system.

To this end as well as others, there is a need for an efficient gain control of the supplemental channel in a communication system.

SUMMARY

In a code division multiple access communication system, a method and an accompanying apparatus provide for controlling gain of a forward supplemental channel by determining gain level of an associated forward fundamental channel (Gfch), determining an adaptive margin (Ma) for the forward supplemental channel and determining a forward supplemental channel gain (Gsch) based on the Gfch and the Ma. The forward supplemental channel is transmitted to the mobile station at the determined Gsch level. A data rate factor based on a data rate of the forward fundamental channel and a data rate of the forward supplemental channel may be determined. The Gsch may be based additionally on the data rate factor. The Gsch may be successively decreased for subsequent data frames targeted for the common mobile station on the forward supplemental channel by successively decreasing the Ma. The Gsch may be increased for a subsequent data frame targeted for the same common mobile station on the forward supplemental channel by increasing the Ma after receiving a supplemental channel frame erasure indicator from the common mobile station.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 6 illustrates an exemplary power control channel frame structure;

FIG. 7 illustrates various exemplary modes of forward link power control;

DETAILED DESCRIPTION

Various aspects of the invention may be incorporated in a system for wireless communications in accordance with the code division multiple access (CDMA) technique which has been disclosed and described in various standards published by the Telecommunication Industry Association (TIA). Such standards include the TIA/EIA-95 standard, TIA/EIA-IS-2000 standard, IMT-2000 standard, and WCDMA standard, all incorporated by reference herein. A copy of the standards may be obtained by accessing the world wide web at the address: http://www.cdg.org, or by writing to TIA, Standards and Technology Department, 2500 Wilson Boulevard, Arlington, Va. 22201, United States of America. The specification generally identified as WCDMA specification, incorporated by reference herein, may be obtained by contacting 3GPP Support Office, 650 Route des Lucioles-Sophia Antipolis, Valbonne-France. The "$3^{rd}$ Generation Partnership Project" (3GPP) is embodied in a set of documents including Document No. 3G TS 25.211, 3G TS 25.212, 3G TS 25.213 and 3G TS 25.214, known as the WCDMA standard. The "TIA/EIA/IS-95 Remote Station-base station Compatibility Standard for Dual-Mode Wideband Spread Spectrum Cellular System" is known as the IS-95 standard. The "TR-45.5 Physical Layer Standard for cdma2000 Spread Spectrum Systems" is known as the CDMA-2000 standard. A system for communication of data is detailed in the "TIA/EIA/IS-856 cdma2000 High Rate Packet Data Air Interface Specification," incorporated by reference herein, is also capable of incorporating various embodiments of the invention.

Generally stated, a novel and improved method and an accompanying apparatus provide for an efficient gain control of a supplemental channel in a CDMA communication system. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
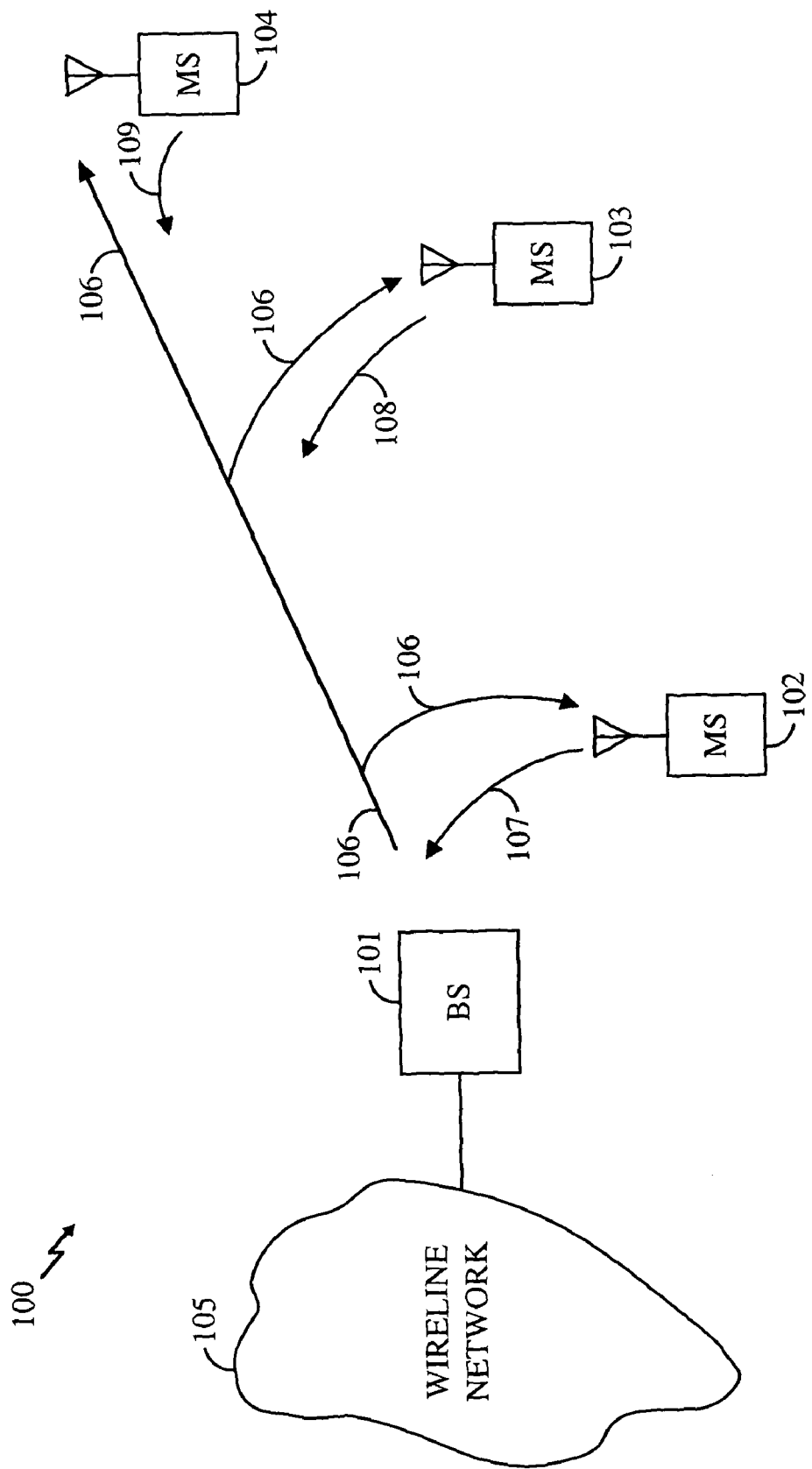
FIG. 1 illustrates a communication system 100 capable of operating in accordance with various embodiments of the invention.

FIG. 1 illustrates a general block diagram of a communication system 100 capable of operating in accordance with any of the code division multiple access (CDMA) communication system standards while incorporating various aspects of the invention. Generally, communication system 100 includes a base station 101 that provides communication links between a number of mobile stations, such as mobile stations 102-104, and between the mobile stations 102-104 and a wireline network 105. Base station 101 may include a number of components, such as a mobile station controller, a base station controller and a radio frequency transceiver. For simplicity, such components are not shown. Base station 101 may also be in communication with other base stations (not shown.) Base station 101 communicates with each mobile station 102-104 via a forward link. The forward link may be maintained by a forward link signal transmitted from base station 101. The forward link signals targeted for mobile stations 102-104 may be summed to form a forward link signal 106. Each of the mobile stations 102-104 receiving forward link signal 106 decodes the forward link signal 106 to extract the information that is targeted for its user.

Mobile stations 102-104 communicate with base station 101 via corresponding reverse links. Each reverse link is maintained by a reverse link signal, such as reverse link signals 107-109 for respectively mobile stations 102-104. Base station 101 may also transmit a predefined series of data bits on a pilot channel via the forward link to all mobile stations to assist each mobile station in decoding the forward link signal 106. Each of the mobile stations 102-104 may transmit a pilot channel to base station 101. The pilot channel transmitted from a mobile station may be used for decoding the information carried by the reverse link signal transmitted from the same mobile station. The use and operation of a pilot channel are well known. A transmitter and a receiver for communicating via the forward and reverse links are included in each mobile station 102-104 and base station 101.

Figure 2:
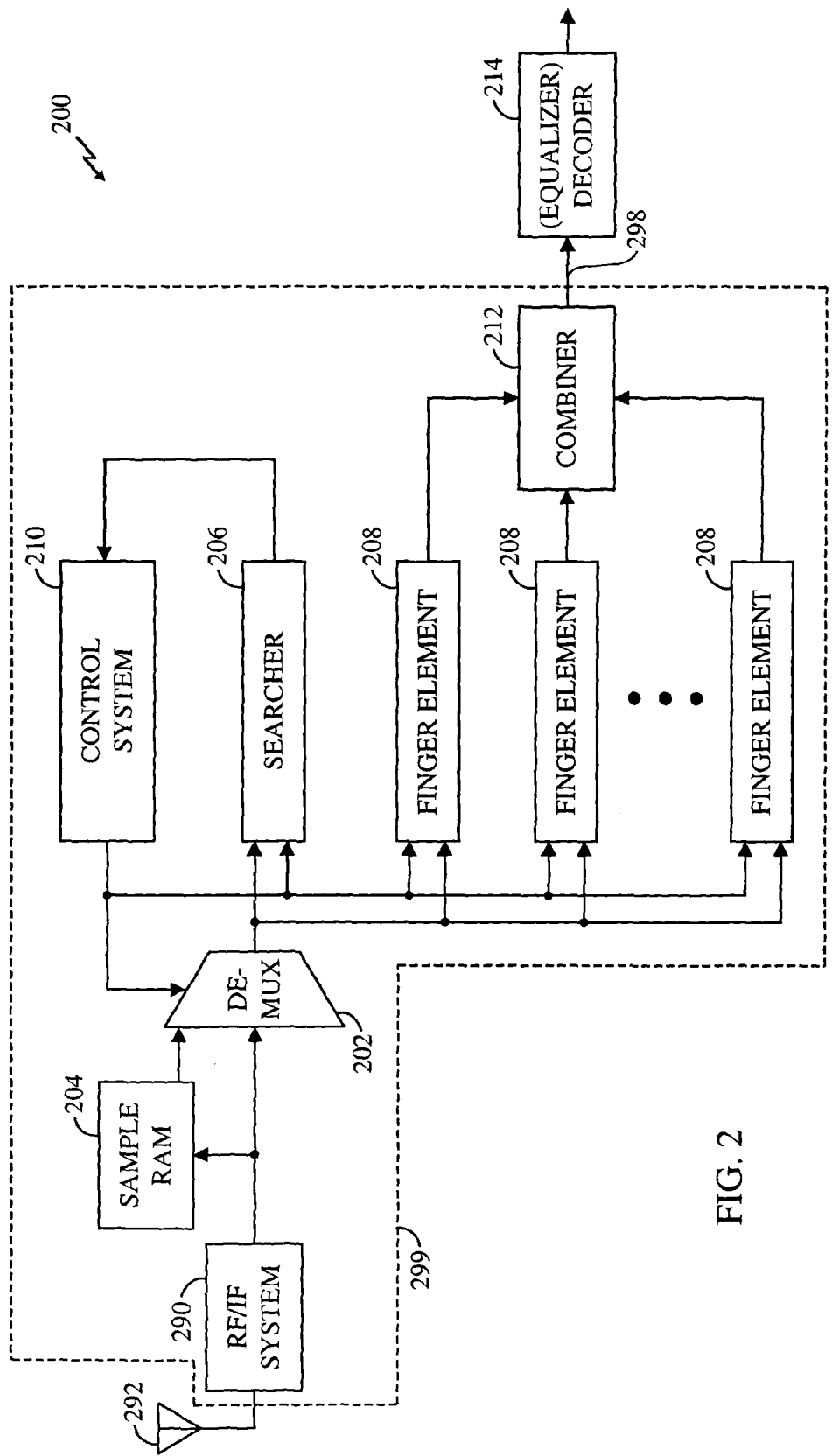
FIG. 2 illustrates a communication system receiver, for operation in a mobile station and a base station, capable of operating in accordance with various embodiments of the invention.

FIG. 2 illustrates a block diagram of a receiver 200 used for processing CDMA signals. Receiver 200 demodulates the received signal to extract the information carried by the received signal. Receive (Rx) samples may be stored in RAM 204. Receive samples are generated by a radio frequency/intermediate frequency (RF/IF) system 290 and an antenna system 292. Antenna system 292 receives an RF signal and passes the RF signal to RF/IF system 290. RF/IF system 290 may be any conventional RF/IF receiver. The received RF signals are filtered, down-converted and digitized to form RX samples at baseband frequencies. The samples are supplied to a demultiplexer (demux) 202. The output of demux 202 is supplied to a searcher unit 206 and finger elements 208. A control unit 210 is coupled thereto. A combiner 212 couples a decoder 214 to finger elements 208. Control unit 210 may be a microprocessor controlled by software and may be located on the same integrated circuit or on a separate integrated circuit. Decoder 214 may include an equalizer (not shown). The decoding function may be combined with the function of the equalizer in decoder 214. The decoding function in decoder 214 may be in accordance with soft-output Viterbi algorithm concatenated, with or without feedback, with functions of an equalizer.

During operation, receive samples are supplied to demux 202. Demux 202 supplies the samples to searcher unit 206 and finger elements 208. Control unit 210 configures finger elements 208 to perform demodulation of the received signal at different time offsets based on search results from searcher unit 206. The results of the demodulation are combined and passed to decoder 214. Decoder 214 decodes the data and outputs the decoded data.

In general for searching, searcher 206 may use non-coherent demodulation of a pilot channel to test timing hypotheses and phase offsets corresponding to various transmitting sources and multi-paths. The demodulation performed by finger elements 208 may be performed via coherent demodulation of other channels such as control and traffic channels. The information extracted by searcher 206 by demodulating a pilot channel may be used in finger elements 208 for demodulation of other channels. The searcher 206 and finger elements 208 may provide both pilot channel searching and demodulation of control and traffic channels. The demodulation and searching can be performed at various time offsets. The results of the demodulation may be combined in combiner 212 before decoding the data transmitted on each channel. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. Receiver 200 may be used in base station 101 and mobile stations 102-104 for decoding the information on respectively reverse and forward links signals. Base station 101 may employ several of receivers 200 to decode the information transmitted from several mobile stations at the same time.

Receiver 200 may also perform interference cancellation through a correlation process. The received samples, after being read from RAM 204, are passed through a correlation process for each received signal. The correlation process may collectively be described as the operations of searcher 206, finger element 208 and combiner 212. Since the received samples contain samples from the signals transmitted from more than one transmitting source, the correlation process may be repeated for each received signal. The correlation process for each received signal may be unique because each signal may require a different correlation parameters as of those found in operations of searcher 206, finger element 208 and combiner 212. Each signal may include a traffic channel and a pilot channel. The PN sequence assigned to the traffic channel and pilot channel carried by each signal may be different. The correlation process may include channel estimation, which includes estimating the channel fading characteristics based on the result of correlating with the pilot channel. The channel estimation information is used for correlating with the traffic channel. Each traffic channel is then decoded. The decoding operation of a traffic channel may be combined with the operation of an equalizer.

The result from each correlation process may pass through a decoding process in decoder 214. If the transmitted channel is encoded via a convolutional encoding process, the decoding process in decoder 214 is performed according to the utilized convolutional code. If the transmitted channel is encoded via a turbo encoding process, the decoding process in decoder 214 is performed according to the utilized turbo code.

Each signal may be decoded to provide enough information about whether a pass indicator is produced for each cyclic redundancy check (CRC) associated with each transmitted frame of data. Operation and use of CRC in a communication system are well known. If the CRC is passed, the decoded result of the channel associated with the passed CRC may be passed on for further receiving operation.

The signals received by base station 101 may be input to receiver 200. Antenna system 292 and RF/IF system 290 receive the signals from the mobile stations 102-104 to produce the samples of the received signals. The received samples may be stored in RAM 204. Receiver 200 may incorporate a number of searchers 206, a number of finger elements 208, a number of combiner 212 and a number of decoder 214 for simultaneously performing the correlation process and the decoding process for all the signals received from different mobile stations. However, only one antenna system 292 and RF/IF system 290 may be necessary.

Each time a correlation process is started, searcher 206 and finger element 208 may start anew for determining non-coherent demodulation of a pilot channel to test timing hypotheses and phase offsets. Searcher 206, or finger element 208, or searcher 206 and finger element 208 in combination, may determine the signal to interference ratio (S/I) for each received signal. The ratio Eb/I may be synonymous with the ratio S/I. The ratio Eb/I is a measure of signal energy over interference per unit of a data symbol or data bit. Therefore, S/I and Eb/I may be interchangeable in some respects. The interference may typically be defined as the power spectral density of interference and the thermal noise.

To control interference and maintain an adequate system capacity while allowing adequate reception at a receiving end, the system controls the gain level of each transmitted channel from each transmitting source, or the data rate of each transmitted channel or both. The gain level may be determined through a power control scheme in the communication system 100. Various power control schemes for controlling power levels of signals in communication system 100 are known. One or more examples are described in the mobile station-base station Compatibility Standard for Wideband Spread Spectrum Cellular Systems, otherwise known as TIA/EIA-95 and TIA/EIA-2000 standards, incorporated by reference herein.

The gain level of each channel may be controlled by two independent power control loops, namely an open loop and a closed loop. The open loop power control is based on the need of each mobile station to maintain an adequate communication link with the base station. Therefore, the mobile station closer to the base station needs less power than the mobile station further away. In the open loop power control, the transmitter sets the gain level of the transmitted channel based on independent measurements of S/I of at least one received channel, such as pilot, paging, sync and traffic channels.

Figure 3:
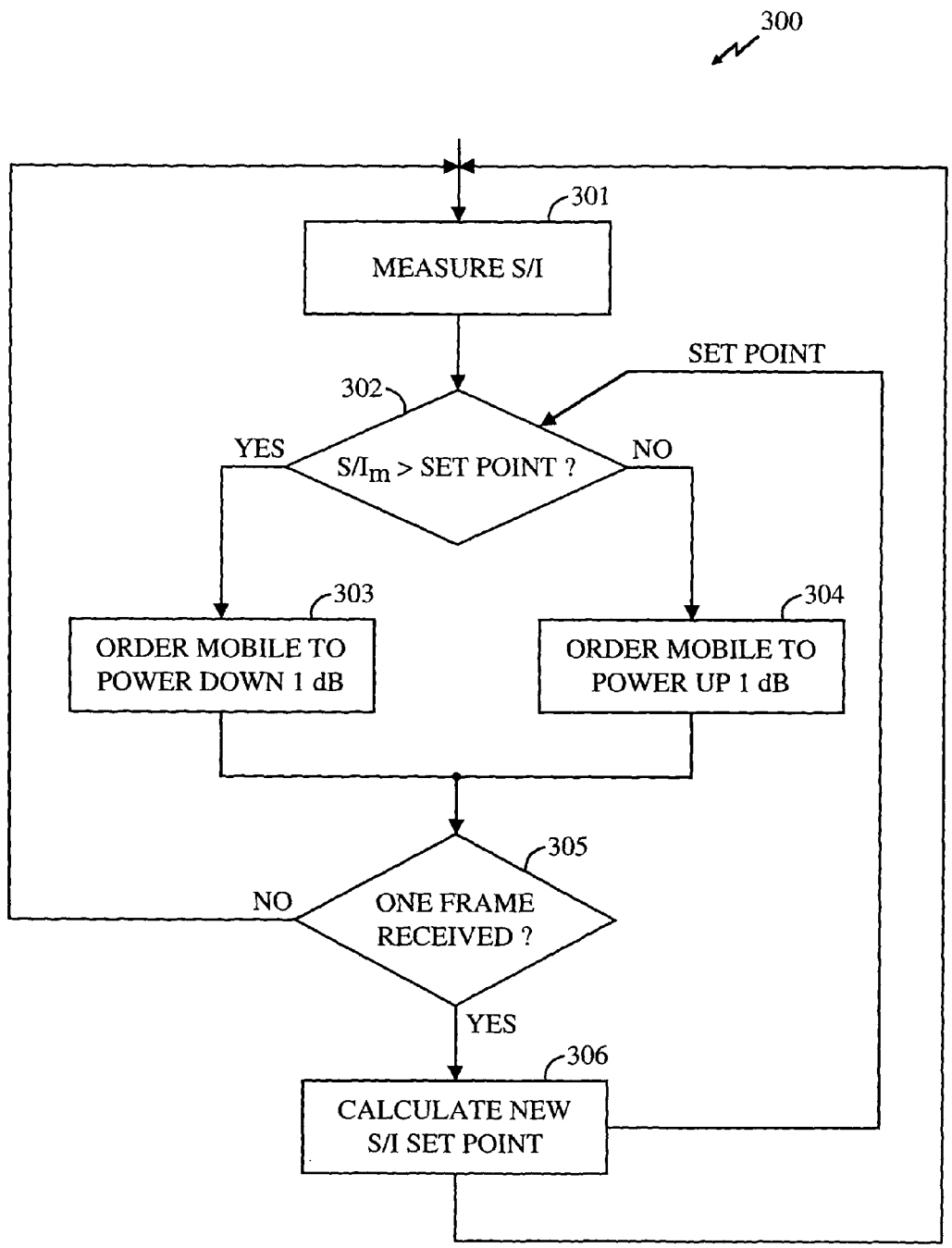
FIG. 3 illustrates a flow chart for controlling power level of a communication channel between a mobile station and a base station, capable of having adjusted operating parameters in accordance with various embodiments of the invention.

FIG. 3 illustrates various steps of a flow diagram 300 of an exemplary closed loop power control. Operation of closed loop power control method 300 begins once a mobile station in communication system 100 seizes a forward link traffic channel. After the initial access attempt by the mobile station, the mobile station sets an initial reverse channel gain level. The initial gain level setting on the reverse link is then adjusted during subsequent communications. The closed loop power control 300 provide the correction to the open loop power control.

To control the gain level of a reverse link channel from a mobile station, base station 101 at step 301 measures the signal to interference ratio (S/I) of the reverse link channel transmitted from the mobile station. The measured S/I is compared with a set point S/I at step 302. The measured S/I may be in the form of Eb/I which is a ratio of bit energy over interference. The set point may be in the same form. The set point is selected for the mobile station. The set point may be initially based on the open loop power setting by the mobile station.

If the measured S/I is higher than the set point, at step 303, base station 101 orders the mobile station to lower the gain level of the reverse link channel by an amount, for example 1 dB. When the measured S/I is higher than the set point, it indicates that the mobile station is transmitting on the reverse link channel at again level higher than is needed to maintain an adequate reverse link communication. As a result, the mobile station is ordered to lower the gain level of its reverse link channel to reduce the overall system interference. If the measured S/I is lower than the set point, at step 304, base station 101 orders the mobile station to increase the gain level of the reverse link channel by an amount, for example 1 dB. When the measured S/I is lower than the set point, it indicates that the mobile station is transmitting on the reverse link channel at a gain level lower than is needed to maintain an adequate reverse link communication. As a result of increasing the gain level, the mobile station may be able to overcome the interference level and provide an adequate reverse link communication.

The operations performed at steps 302-304 may be referred to as the inner loop power control. The inner-loop power control keeps the reverse link S/I at the base station 101 as close as possible to its target threshold as provided by the set point. The target S/I is based on the set point selected for the mobile station. The power up or power down may be performed several times during a time frame. One time frame may be divided into 16 power control groups. Each power control group consists of several data symbols. The power up or power down command may be transmitted 16 times per frame. If one frame of data has not been received at step 305, the power control loop 300 continues to measure S/I of the reverse link channel during the next power control group at step 301. The process is repeated at steps 302-304 until at least one frame of data is received from the mobile station.

A single set point or target may not be satisfactory for all conditions. Therefore, the set point used at step 302 may also change depending on a desired reverse link channel error rate. If one frame of data has been received at step 305, a new S/I set point may be calculated at step 306. The new set point becomes the new S/I target for the mobile station. The new set point may be based on a number of factors including the frame error rate. For example, if the frame error rate is above a predetermined level, indicating unacceptable frame error rate, the set point may be raised to a higher level. By raising the set point to a higher level, the mobile station consequently increases the reverse link channel gain level via the comparison at step 302 and a power up command at step 304. If the frame error rate is below a predetermined level indicating an acceptable frame error rate, the set point may be lowered to a lower level. By lowering the set point to a lower level, the mobile station consequently decreases the reverse link channel gain level via the comparison at step 302 and a power down command at step 303. The operations performed at steps 305-306, looping back from step 306 to step 302 to indicate a new set point and looping back to step 301 for measuring the S/I of the new frames may be viewed as the outer loop operation. The outer-loop power control may command once every frame. The closed loop power control may command once every power control group. One frame and one power control group may be, respectively, 20 and 1.25 mSec long.

The communication system 100 may employ a forward link power control scheme to reduce interference. The mobile stations 102-104 communicate to base station 101 periodically about the voice and data quality. The frame error rate and quality measurements are reported to base station 101 via a power measurement report message. The message contains the number of frames received in error on the forward link channel during an interval. The gain level of the forward link channel is adjusted based on the number of frame errors. For fast response, a reverse link erasure bit may be used to inform base station 101 whether the previous frame was received with or without error. The channel power gain may be continuously adjusted while monitoring the message or the erasure bit.

Figure 4:
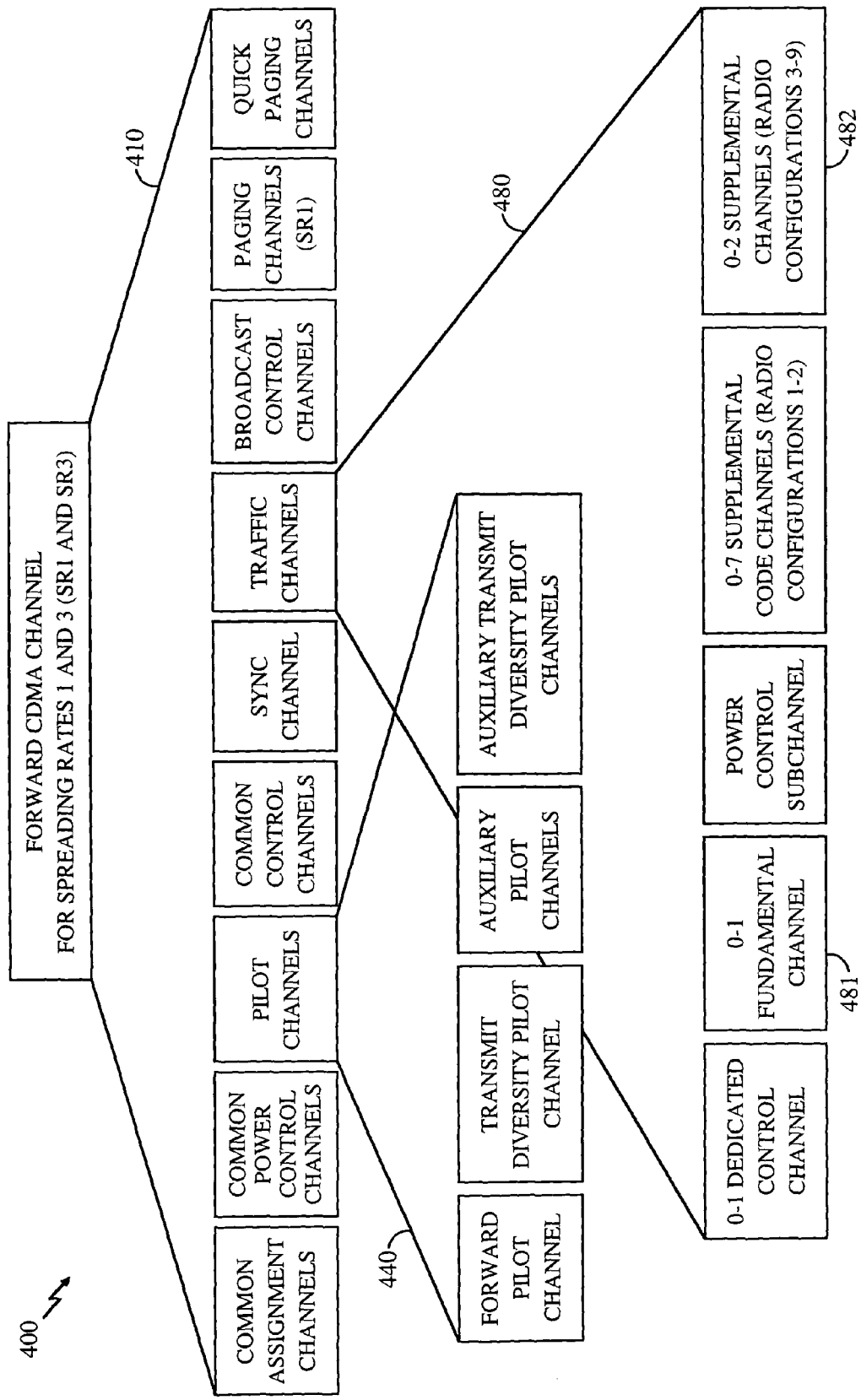
FIG. 4 illustrates an exemplary forward link channel structure.

Referring to FIG. 4, a forward link channel structure 400 depicts the structure of code channels that may be transmitted by base station 101. Forward link channel structure 400 includes a forward channel 410. Forward channel 410 may include a forward traffic channel 480 and a forward pilot channel 440. Forward traffic channel 480 includes at least a forward fundamental channel 481. Each forward fundamental channel 481 may have an associated forward supplemental channel 482. The resources used for transmission of forward supplemental channel 482 may be shared among mobile stations 102-104. As such, forward supplemental channels 482 may be referred to as the forward shared supplemental channel 482. The gain levels of forward fundamental channel 481 and the associated supplemental channel 482 may be controlled in accordance with various embodiments.

Figure 5:
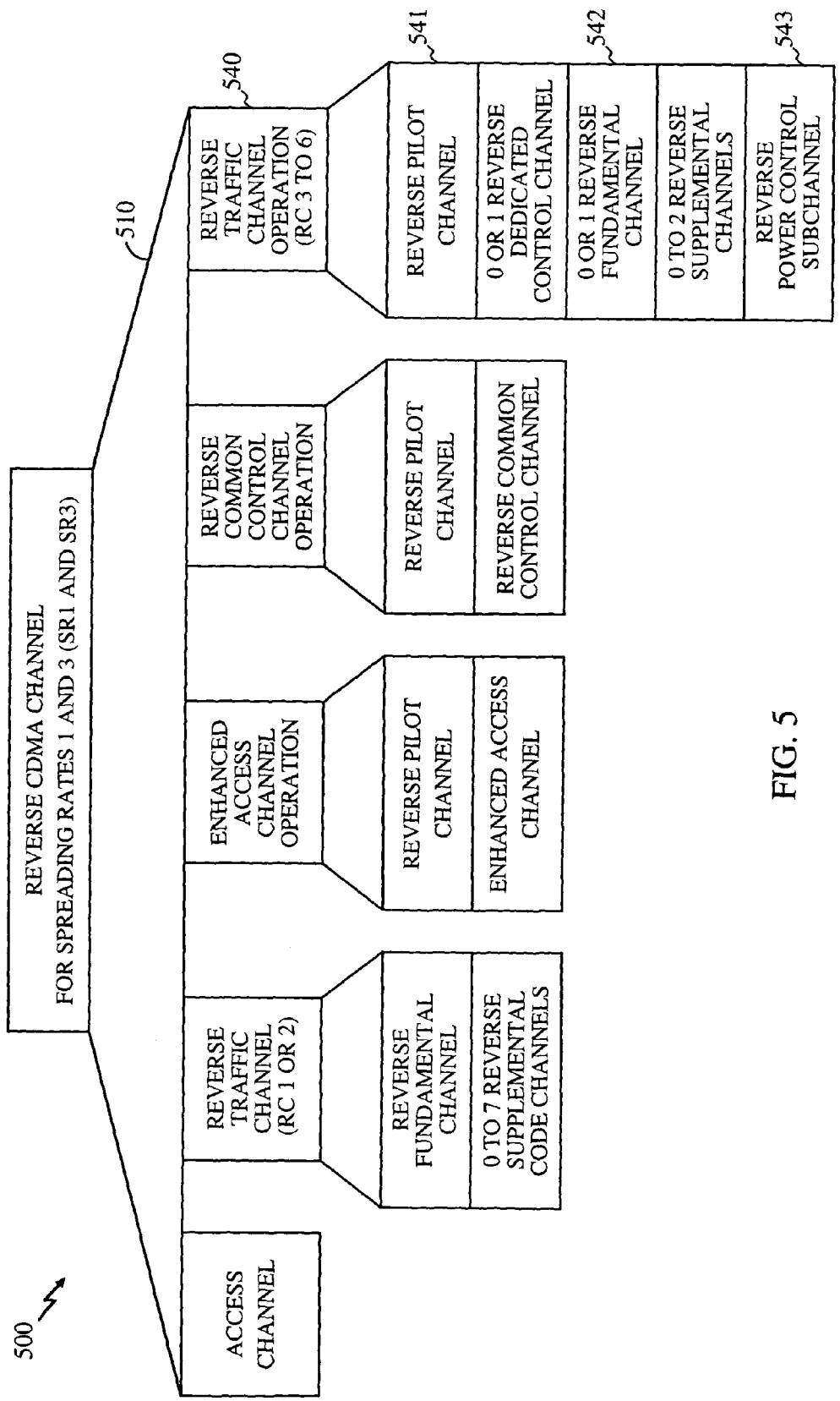
FIG. 5 illustrates an exemplary reverse link channel structure.

Referring to FIG. 5, a reverse link channel structure 500 depicts the structure of reverse link code channels that may be transmitted by mobile stations 102-104. Reverse link channel structure 500 includes a reverse link channel 510. Reverse link channel 510, among several channels, includes a reverse traffic channel 540 for radio configurations three through six. Various radio configurations have been described in the relevant standards incorporated by reference herein. Generally, the communications between base station 101 and mobile stations 102-104 may be limited to a set of predefined data rates and modulation schemes in each radio configuration. Reverse traffic channel 540, among several channels, includes a reverse pilot channel 541, a reverse fundamental channel 542 and a reverse power control sub-channel 543. The reverse pilot channel 541 and reverse power control sub-channel 543 are multiplexed together in each power control group in a frame of data. The data communicated via reverse power control sub-channel 543 may be used to control gain levels of forward fundamental channel 481 and the associated supplemental channel 482 in accordance with various embodiments.

Referring to FIG. 6, a frame of data 600 depicts multiplexing of the pilot data of reverse pilot channel 541 and power control data of reverse power control sub-channel 543. Each frame may contain 16 power control groups. A power control group 610 depicts multiplexing of the pilot data of reverse pilot channel 541 and power control data of reverse power control sub-channel 543 in each power control group. Each power control group 610 is used to transmit data of reverse pilot channel 541 and reverse power control sub-channel 543. The reverse power control sub-channel 543 applies to radio configurations three through six. Each mobile station supports the inner and outer power control loops for the forward traffic channel 480. The outer power control loop estimates the set-point value based on Eb/Nt to achieve the target frame error rate on each assigned forward traffic channel 480. The inner power control loop compares the Eb/Nt of the received forward traffic channel with the corresponding outer power control loop set-point to determine the value of the power control bits to be sent to base station 101 on reverse power control sub-channel 543. The reverse power control sub-channel 543 may be used by each mobile station 102-104 to transmit to base station 101 an erasure indicator bit (EIB) or a quality indicator bit (QIB). The value of EIB or QIB from a particular mobile station determines for base station 101 whether to increase or decrease the power level on forward traffic channel 480 targeted for that particular mobile station, or re-transmission of the data on a subsequent data frame or both.

The communication system 100 may employ several modes of a forward power control scheme. The forward traffic channel 480 includes forward fundamental channel 481 and forward supplemental channel 482. The forward fundamental channel 481, for the forward power control, may be considered as the primary channel and the supplemental channel 482 as the secondary channel. One frame of data may be for 20 mSec. Each frame of data may include 16 power control groups. Therefore, if the sixteen power control groups are used for controlling gain level of a forward channel, the feedback rate is at 800 bps. If the gain levels of two forward channels, such as forward fundamental channel 481 and forward supplemental channel 482, are being controlled, the feedback rate is less than 800 bps. To control gain level of the primary and the secondary channels at different feedback rates, different modes of the forward power control may be used.

Referring to FIG. 7, a table 700 provides various forward power control modes in accordance with various embodiments. For example, for the mode "000", all sixteen power control groups are used for power control of the primary channel, such as fundamental channel 481. In another example, in mode "110", the even numbered power control groups are used to communicate power control bits relating to the primary channel, such as fundamental channel 481. The odd numbered power control groups are used to communicate QIB or EIB associated with a secondary channel, such as the supplemental channel 482. A forward fundamental channel 481 from base station 101 to a mobile station may have one or two associated forward supplemental channels, such as forward supplemental channel 482. The associated forward supplemental channel 482 is used to communicate data to the mobile station in addition to the data being communicated on forward fundamental channel 481. The resources used for communications of the supplemental channel 482 may be shared among several forward fundamental channels.

Figure 8:
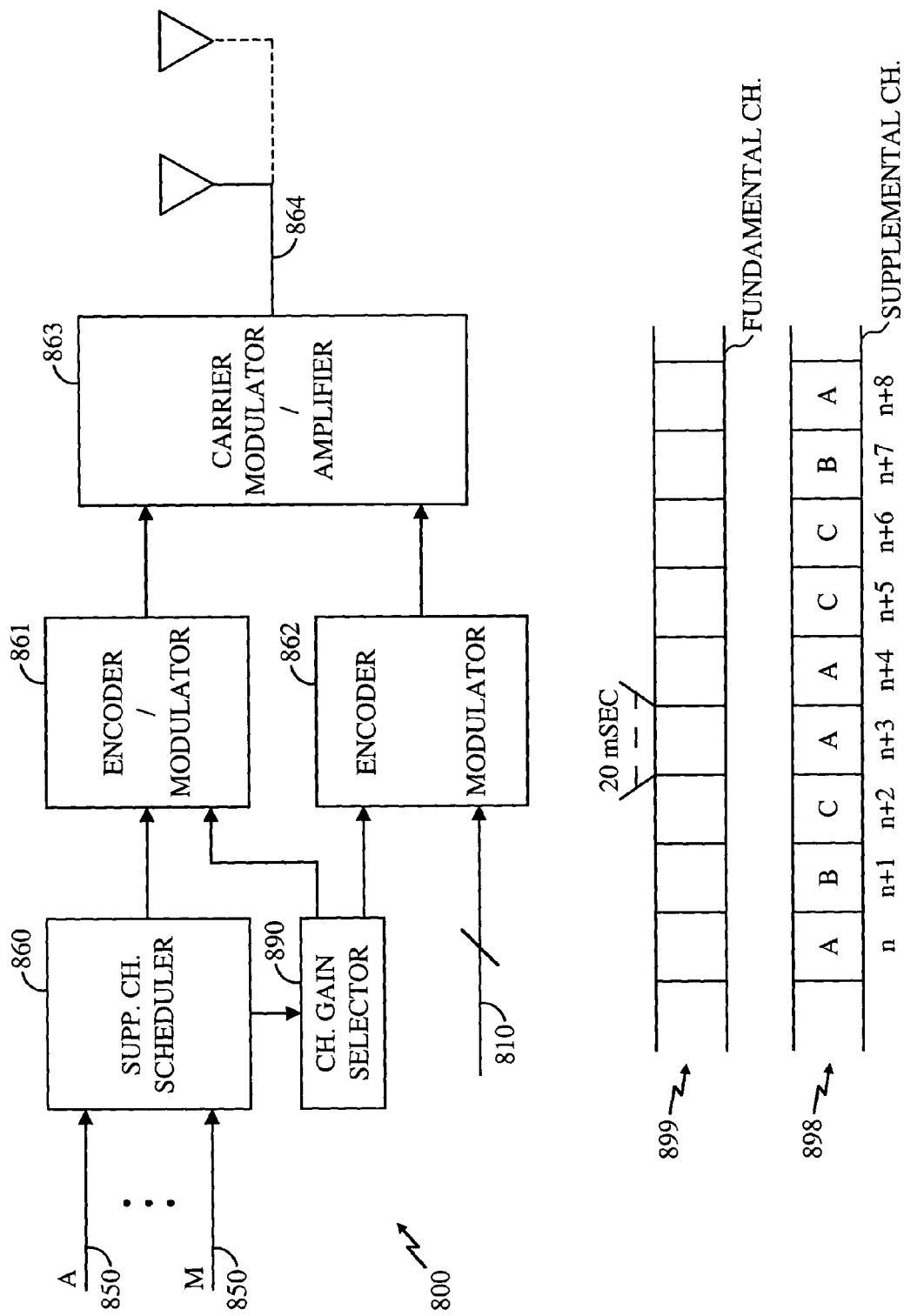
FIG. 8 illustrates a communication system transmitter capable of operating in accordance with various aspects of the invention.

Referring to FIG. 8, a block diagram of a transmitter 800 is shown in accordance with various embodiments. Transmitter 800 may be used in base station 101 for transmitting data to mobile stations 102-104 on forward fundamental channel 481 and forward supplemental channel 482. An input 810 receives data for transmission on forward fundamental channel 481. The data may be received from wire-line network 105. The data may be targeted for a mobile station, such as mobile stations 102-104. Each mobile station in a forward link communication with base station 101 may have a forward fundamental channel 481. Additional data may be transmitted to the target mobile station on forward supplemental channel 482.

The data transmitted on forward fundamental channel 481 may be continuos over several data frames 899. Each data frame may be 20 mSec long in accordance with an embodiment. Data on the forward supplemental channel 482 may be transmitted sporadically on several data frames 898 to a target mobile station. Inputs 850A-850M receive data for transmission on forward supplemental channel 482 for several mobile stations. A supplemental channel scheduler 860 selects data at input 850 for transmission in data frames 898 on the supplemental channel 482. In one example, supplemental channel scheduler 860 may select from data frames 898 the data frames "n, n+3, n+4 and n+8" for transmission of data on the supplemental channel 482 to mobile station 102. The data frames "n+1 and n+7" may be selected for transmission of data on supplemental channel 482 to mobile station 103. The data frames "n+2, n+5 and n+6" may be selected for transmission of data on supplemental channel 482 to mobile station 104.

On the reverse power control sub-channel 543, the mobile stations 102-104 transmit an erasure indicator to the base station 101 during each data frame. The erasure indicator indicates erroneous or error-free received data on the forward supplemental channel 482. The mobile stations 102-104 do not have prior information about the scheduling of data on different data frames 898. The mobile stations 102-104 attempt to decode data on the supplemental channel 482 during every data frame. If the data received on the supplemental channel 482 is received in error or targeted for another mobile station, an erasure indicator indicating erroneous reception is transmitted to the base station 101 on reverse power control sub-channel 543. Base station 101 may ignore the erasure indicators from the mobile stations that are not selected for transmission on the supplemental channel 482.

For example, base station 101 expects to receive, during data frame "n" with appropriate round trip delay time, an erasure indicator indicating erroneous or error-free reception of the transmitted data on the reverse power control sub-channel 543 from mobile station 102 in response to transmitting the data on supplemental channel 482 during data frame "n."

The data on the supplemental channel 482 and fundamental channel 481 are modulated and encoded in blocks 861 and 862 respectively for transmission to a mobile station. The modulation scheme and the encoding steps are described in the specification of at least one of the standards, such as IS-2000 standard, incorporated by reference herein.

The gain of supplemental channel 482 and gain of fundamental channel 481 may be selected by a channel gain selector 890 in accordance with an embodiment. For example, the gain of forward fundamental channel 481 may be selected based on the forward link power control scheme used in the communication system 100. In case, the reverse power control sub-channel 543 indicates poor reception of the fundamental channel 481, the gain of the fundamental channel 481 may be increased via the forward link power control loops to improve the Eb/Nt at the target mobile station. In case, the reverse power control sub-channel 543 indicates good reception of the fundamental channel 481, the gain of the fundamental channel 481 may be decreased to lower the Eb/Nt at the target mobile station.

The gain level of the supplemental channel 482 may be determined based on the gain level selected for fundamental channel 481 in accordance with an embodiment. Each data frame of supplemental channel 482 may be associated with a fundamental channel 481 targeted for a specific mobile station. Therefore, the gain level of supplemental channel 482 may be determined based on the selected gain level of an associated fundamental channel 481 in accordance with an embodiment. After the gain adjustments in the encoder and modulator blocks 861 and 862, the outputs pass through a carrier modulation block 863. The resulting signal may be amplified before being transmitted from a set of antennas 864 to mobile stations 102-104.

The signals transmitted between mobile stations 102-104 and base station 101 may propagate through a channel with various fading conditions. An additive white Gaussian noise (AWGN) channel condition approximates a slow fading channel condition for the signal. The forward link power control loop used for controlling gain level of a channel between mobile stations 102-104 and base station 101 may use an Eb/Nt threshold level such that the frame error rate is maintained at an adequate level. The Eb/Nt threshold may be maintained and selected by the forward link power control loop such that the average channel gain is at a level above the AWGN channel level. The average channel gain may be maintained at a level comparable to the AWGN level plus a margin. By allowing the average channel gain to be above the AWGN level, in a fading channel condition, the frame error rate is maintained at an adequate level most of the time. One frame out of many frames may arrive at a poor signal to noise ratio causing a frame error at the receiver. Such a frame error occurs at the deep part of the channel fading condition.

Figure 9:
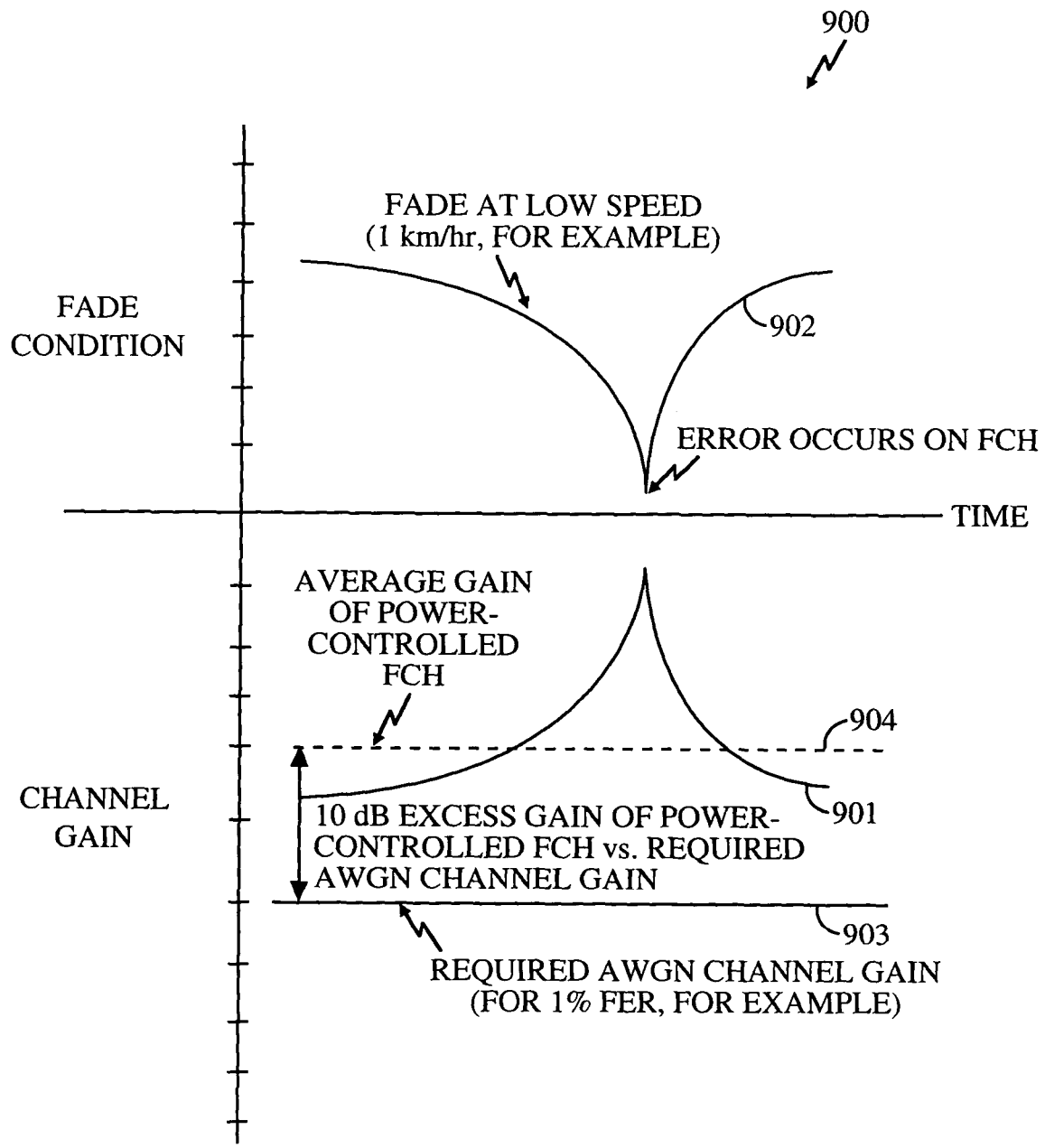
FIG. 9 illustrates an exemplary channel fading condition and associated channel gain conditions.

Referring to FIG. 9, a graph 900 depicts an example of a channel fading condition 902 and the channel gain 901 with respect to time. The gain of the channel is at a peak level when the channel fading condition is at a bottom point. The AWGN of the channel may be at a gain level 903. The average gain of the channel with the power control may be set at an average gain level 904. The margin between gain level 903 and the average gain level 904 allows the communications over the channel to be at an adequate frame error rate under most fading conditions. The communications at the bottom of the fade condition may result in erroneous reception of one or more frames. Such a channel gain model and the associated power control scheme works very well for forward fundamental channel 481 due to its continuous nature of communication to a mobile station over a period of time.

The communications over supplemental channel 482 targeted for the same mobile station may be sporadic. The supplemental channel 482 may be shared among several mobile stations 102-104. The channel condition of fundamental channel 481 at each mobile station may not be the same. The channel condition at one mobile station may be better than others. As such, the communication on the supplemental channel may be based on a priority index for each frame of data. For example, if the priority index of a mobile station is higher than others and the mobile station has a forward supplemental channel 482 with base station 101, the immediately following frame of data on the supplemental channel 482 may be used to transmit data to the mobile station. The supplemental channel scheduler 860 may be used to schedule data at input 850 corresponding to the mobile station with the highest priority index. In one example, the priority index may be equal to the inverse of the product of the average throughput (T) and the channel gain of the associated forward fundamental channel 481. A priority index may be calculated for each mobile station.

The power level of forward fundamental channel 481 may be based on a periodic feedback from the mobile station. The forward fundamental channel 481 normally has a continuous communications of data between the receiver and the transmitter. Therefore, the average gain level 904 of forward fundamental channel 481 may be at a level above an absolute minimum (AWGN) level that accounts for variations in the propagation channel over time. The communications on forward supplemental channel 482 may be sporadic for a mobile station depending on the priority index of the mobile station. As such, the forward supplemental channel 482 and forward fundamental channel 481 do not experience similar channel conditions in accordance with an embodiment.

Figure 10:
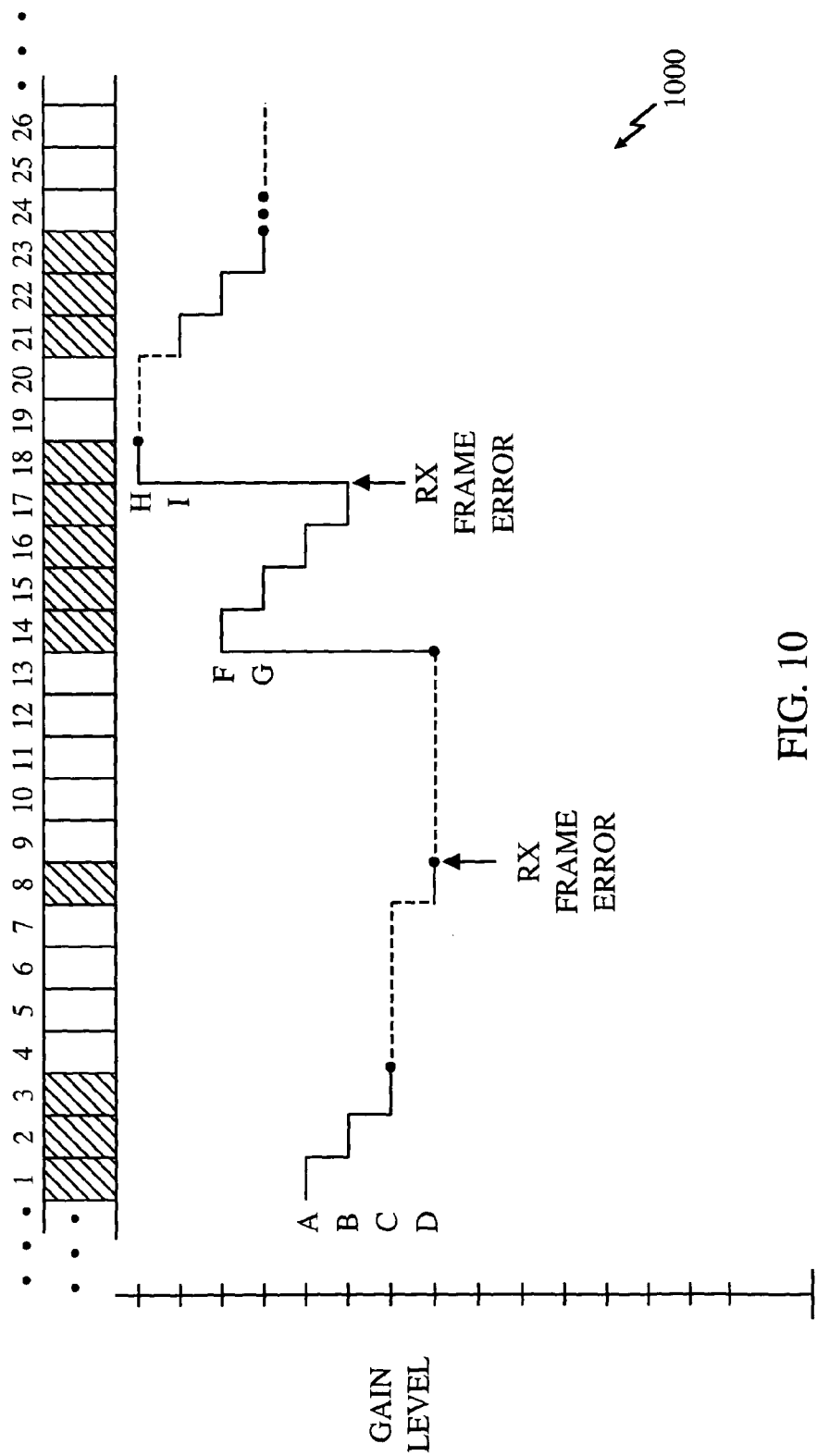
FIG. 10 illustrates an exemplary supplemental channel gain level determined in accordance with various aspects of the invention.

Referring to FIG. 10, a graph 1000 shows variation of a channel gain of supplemental channel 482 as determined in accordance with various embodiments. The gain of the supplemental channel (Gsch) 482 may be set equal to the gain of the fundamental channel (Gfch) 481 plus an adaptive margin (Ma). The gain of the supplemental channel (Gsch) 482 may also depend on a data rate factor in accordance with an embodiment. The data rate factor may be based on the data rate of supplemental channel 482 (Rsch) and the data rate of the associated fundamental channel 481 (Rfch). The adaptive margin Ma may change with every frame of data scheduled for the mobile station in accordance with an embodiment. For example, at an initial time, data frame 1, the Gsch may be at a level "A". At the data frame 2, the next data frame scheduled for transmission on supplemental channel 482 to the same mobile station, the Gsch is dropped by an amount to the level "B". At the data frame 3, the next data frame scheduled for transmission on supplemental channel 482 to the same mobile station, the Gsch is dropped again by an amount to the level "C". At the data frame 8, the next data frame scheduled for transmission on the supplemental channel 482 to the same mobile station, the Gsch is dropped again by an amount to the level "D". The drop in the supplemental channel gain Gsch may be accomplished by adjusting the adaptive margin Ma before each transmission.

If a data frame on the supplemental channel 482 is received in error, the Gsch for the next scheduled data frame is increased by an amount sufficiently large that, perhaps, provide adequate reception at the receiver in accordance with an embodiment. In this case, at the data frame 14, the next data frame scheduled for transmission on the supplemental channel 482 to the same mobile station, the Gsch is increased by an amount to the level "F". The increase of the supplemental channel gain Gsch from the gain level D to the gain level F is sufficiently large that allows error-free communication. The increase in the supplemental channel gain Gsch may be accomplished by adjusting the adaptive margin Ma before each transmission in accordance with an embodiment. If no frame error received after data frame 14, the supplemental channel gain Gsch begins to drop successively by an amount after each data frame scheduled for transmission on the supplemental channel 482 to the same mobile station in accordance with an embodiment.

On the reverse power control sub-channel 543, in mode "110" of the forward power control modes, the even numbered power control groups are used to communicate power control bits relating to the fundamental channel 481, and the odd numbered power control groups are used to communicate data frame error via QIB or EIB associated with the supplemental channel 482. The adaptive margin Ma is increased when a frame error is received, and decreased when a data frame is received with error as indicated by QIB or EIB on the reverse power control sub-channel 543 in accordance with an embodiment. In one example, if the gain of the forward fundamental channel Gfch and the data rate factor remain the same, the behavior of the adaptive margin Ma may be as shown in graph 1000. Therefore, the gain of the supplemental channel Gsch is dynamically controlled by determining the adaptive margin Ma before each scheduled data frame transmission to the same mobile station in accordance with an embodiment.

Figure 11:
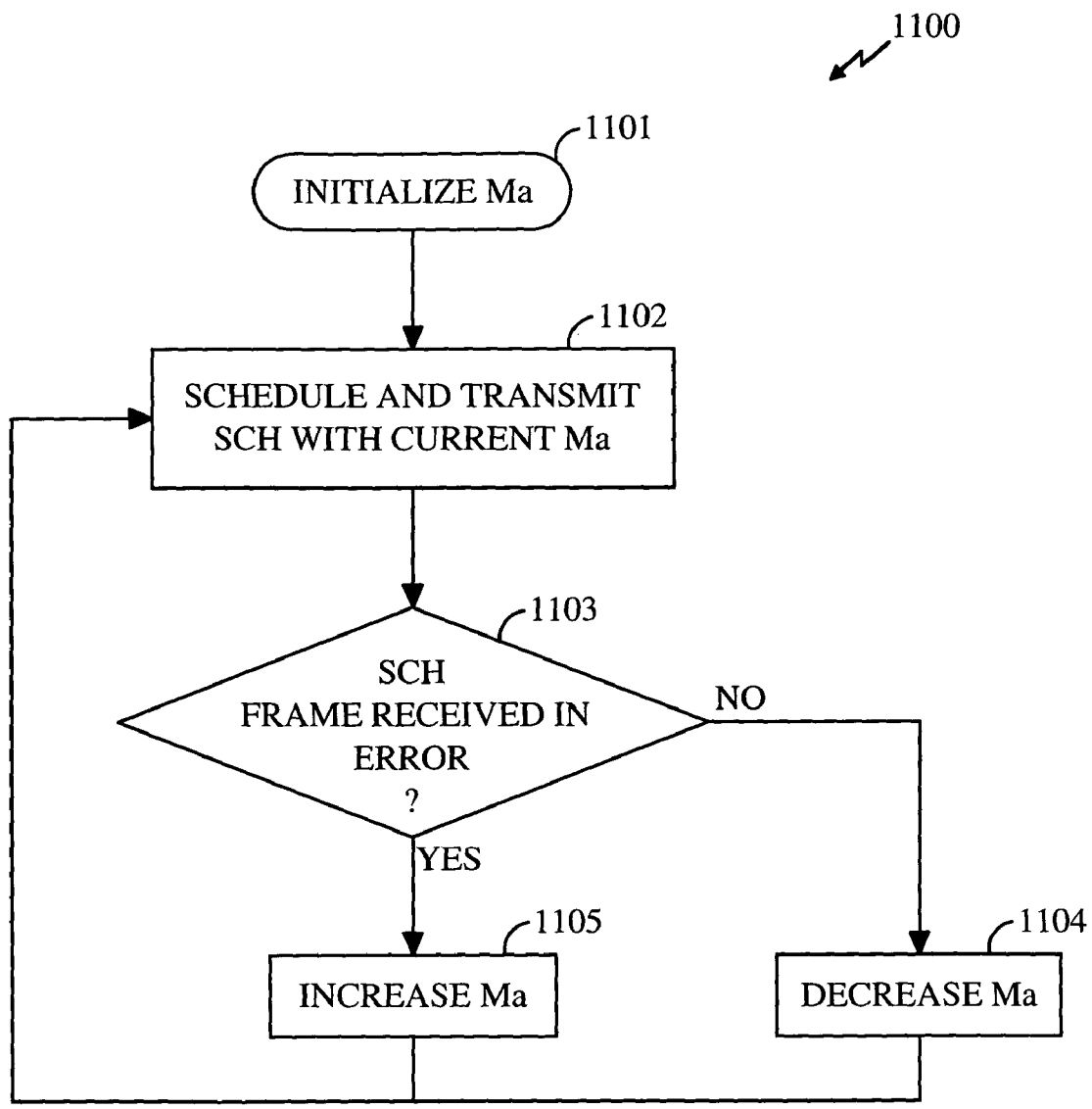
FIG. 11 illustrates a flow chart for determining an adaptive margin Ma used for determining gain level of a supplemental channel.

Referring to FIG. 11, a flow chart 1100 depicts a method for determining the adaptive margin Ma for a data frame transmitted on supplemental channel 482 targeted for a mobile station in accordance with an embodiment. Various steps of flow chart 1100 may be performed by channel gain selector 890 in accordance with an embodiment. At a step 1101, the adaptive margin Ma may be initialized for the first data frame on supplemental channel 482 targeted for the mobile station. Such an initialization may be performed before transmitting the first data frame on supplemental channel 482 to the mobile station. At step 1102, one data frame on supplemental channel 482 is transmitted to the mobile station at a gain level Gsch based on at least the adaptive margin Ma. At step 1103, the channel gain selector 890 determines whether a previous data frame transmitted on supplemental channel 482 to the same mobile station is received without error. Such information may be communicated to the base station on the reverse power control sub-channel 543. If the data frame is received without error, the adaptive margin Ma is decreased at step 1104 for a subsequent data frame transmitted to the same mobile station. If the data frame is received with error, the adaptive margin Ma is increased at step 1105 for a subsequent data frame transmitted to the same mobile station. The amount of increase at step 1105 is much larger than the amount of decrease at step 1104 in accordance with an embodiment. The increase at step 1105 may be equal to 0.5 dB in comparison to a 0.005 dB decrease at step 1104.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a communication system, a method for controlling gain of a supplemental channel comprising:
   determining gain level of a fundamental channel (Gfch), wherein said fundamental channel is associated with said supplemental channel for being targeted for a common receiving station;
   determining an adaptive margin (Ma) for said supplemental channel;
   adjusting said Ma based on errors and non-errors in the supplemental channel before each scheduled data transmission to said common receiving station; and
   determining a supplemental channel gain (Gsch) based on said Gfch and said Ma.

2. The method as recited in claim 1 further comprising: transmitting said supplemental channel at said Gsch level.

3. The method as recited in claim 1 further comprising: determining a data rate factor based on a data rate of said fundamental channel and data rate of said supplemental channel, wherein said Gsch is based on said data rate factor.

4. The method as recited in claim 1 further comprising: decreasing said Gsch for a subsequent data frame targeted for said common receiving station by decreasing said Ma.

5. The method as recited in claim 1 further comprising: successively decreasing said Gsch for subsequent data frames targeted for said common receiving station on said supplemental channel by successively decreasing said Ma.

6. The method as recited in claim 1 further comprising: increasing said Gsch for a subsequent data frame targeted for said common receiving station on said supplemental channel by increasing said Ma after receiving a supplemental channel frame erasure indicator from said common receiving station.

7. The method as recited in claim 1 further comprising: successively decreasing said Gsch for subsequent data frames targeted for said common receiving station on said supplemental channel by successively decreasing said Ma until receiving a supplemental channel frame erasure indicator from said common receiving station.

8. The method as recited in claim 7 further comprising: increasing said Gsch for a subsequent data frame targeted for said common receiving station on said supplemental channel by increasing said Ma after receiving said supplemental channel frame erasure indicator from said common receiving station.

9. In a communication system, an apparatus for controlling gain of a supplemental channel comprising:
   a channel gain selector for determining gain level of a fundamental channel (Gfch), wherein said fundamental channel is associated with said supplemental channel for being targeted for a common receiving station, determining an adaptive margin (Ma) for said supplemental channel and adjusting said Ma based on errors and non-errors in the supplemental channel before each scheduled data transmission to the common receiving station and determining a supplemental channel gain (Gsch) based on said Gfch and said Ma.

10. The apparatus as recited in claim 9 further comprising: a transmitter for transmitting said supplemental channel at said Gsch level.

11. The apparatus as recited in claim 9 wherein said channel gain selector determines a data rate factor based on a data rate of said fundamental channel and data rate of said supplemental channel, wherein said Gsch is based on said data rate factor.

12. The apparatus as recited in claim 9 wherein said channel gain selector decreases said Gsch for a subsequent data frame targeted for said common receiving station on said supplemental channel by decreasing said Ma.

13. The apparatus as recited in claim 9 wherein said channel gain selector successively decreases said Gsch for subsequent data frames targeted for said common receiving station on said supplemental channel by successively decreasing said Ma.

14. The apparatus as recited in claim 9 wherein said channel gain selector increases said Gsch for a subsequent data frame targeted for said common receiving station on said supplemental channel by increasing said Ma after receiving a supplemental channel frame erasure indicator from said common receiving station.

15. The apparatus as recited in claim 9 wherein said channel gain selector successively decreases said Gsch for subsequent data frames targeted for said common receiving station on said supplemental channel by successively decreasing said Ma until receiving a supplemental channel frame erasure indicator from said common receiving station.

16. The apparatus as recited in claim 15 wherein said channel gain selector increases said Gsch for a subsequent data frame targeted for said common receiving station on said supplemental channel by increasing said Ma after receiving said supplemental channel frame erasure indicator from said common receiving station.

17. A communication system comprising:
a transmitter for determining channel gain of a supplemental channel based on a fundamental channel gain of a fundamental channel and for determining a channel adaptive gain margin for said supplemental channel and adjusting said channel adaptive gain margin based on errors and non-errors in the supplemental channel before each scheduled data transmission to a common receiving station, wherein said fundamental channel and said supplemental channel are targeted for said common receiving station.

18. The system as recited in claim 17 wherein said transmitter transmits said supplemental channel to said common receiving station at said determined channel gain.

19. The system as recited in claim 18 wherein said transmitter decreases successively, at each frame of data targeted for said common receiving station, said determined supplemental channel gain by decreasing successively said channel adaptive gain margin and transmits, at said each frame of data targeted for said common receiving station, said supplemental channel to said common receiving station at said successively reduced gain level until a supplemental channel frame error indicator is received from said common receiving station.

20. The system as recited in claim 18, after receiving a supplemental channel frame error indicator from said common receiving station, wherein said transmitter increases at a next frame of data said determined supplemental channel gain by increasing said channel adaptive gain margin and transmits at said next frame of data said supplemental channel to said common receiving station at said increased gain level.

21. The system as recited in claim 17 further comprising:
a receiver in said common receiving station for receiving said supplemental channel and said fundamental channel;
a controller in said common receiving station for determining a supplemental channel frame error rate of said supplemental channel.

22. An apparatus for controlling gain of a supplemental channel comprising:
means for determining gain level of a fundamental channel (Gfch), wherein said fundamental channel is associated with said supplemental channel for being targeted for a common receiving station;
means for determining an adaptive margin (Ma) for said supplemental channel;
means for adjusting said Ma based on errors and non-errors in the supplemental channel before each scheduled data transmission to said common receiving station; and
means for determining a supplemental channel gain (Gsch) based on said Gfch and said Ma.

23. The apparatus as recited in claim 22 further comprising:
means for transmitting said supplemental channel at said Gsch level.

24. The apparatus as recited in claim 22 further comprising:
means for determining a data rate factor based on a data rate of said fundamental channel and data rate of said supplemental channel, wherein said Gsch is based on said data rate factor.

25. The apparatus as recited in claim 22 further comprising:
means for decreasing said Gsch for a subsequent data frame targeted for said common receiving station by decreasing said Ma.

26. The apparatus as recited in claim 22 further comprising:
means for successively decreasing said Gsch for subsequent data frames targeted for said common receiving station on said supplemental channel by successively decreasing said Ma.

27. The apparatus as recited in claim 22 further comprising:
means for increasing said Gsch for a subsequent data frame targeted for said common receiving station on said supplemental channel by increasing said Ma after receiving a supplemental channel frame erasure indicator from said common receiving station.

28. The apparatus as recited in claim 22 further comprising:
means for successively decreasing said Gsch for subsequent data frames targeted for said common receiving station on said supplemental channel by successively decreasing said Ma until receiving a supplemental channel frame erasure indicator from said common receiving station.

29. A processor-readable medium including processor-executable instructions encoded thereon for performing a method for controlling gain of a supplemental channel comprising:
determining gain level of a fundamental channel (Gfch), wherein said fundamental channel is associated with said supplemental channel for being targeted for a common receiving station;
determining an adaptive margin (Ma) for said supplemental channel adjusting said Ma based on errors and non-errors in the supplemental channel before each scheduled data transmission to said common receiving station; and
determining a supplemental channel gain (Gsch) based on said Gfch and said Ma.

30. The processor-readable medium as recited in claim 29 further comprising processor-executable instructions for:
transmitting said supplemental channel at said Gsch level.

31. The processor-readable medium as recited in claim 29 further comprising processor-executable instructions for:
successively decreasing said Gsch for subsequent data frames targeted for said common receiving station on said supplemental channel by successively decreasing said Ma.

32. The processor-readable medium as recited in claim 29 further comprising processor-executable instructions for:
increasing said Gsch for a subsequent data frame targeted for said common receiving station on said supplemental channel by increasing said Ma after receiving a supplemental channel frame erasure indicator from said common receiving station.

* * * * *

UNITED STATES PATENT AND TRADEMARK OFFICE
CERTIFICATE OF CORRECTION

PATENT NO.           : 7,746,831 B2                                                       Page 1 of 1
APPLICATION NO.      : 11/212323
DATED                : June 29, 2010
INVENTOR(S)          : Chaponniere et al.

It is certified that error appears in the above-identified patent and that said Letters Patent is hereby corrected as shown below:

Column 16, line 43, claim 29: "channel" to read as --channel;--

Signed and Sealed this
Thirteenth Day of September, 2011

David J. Kappos
*Director of the United States Patent and Trademark Office*